(12) United States Patent
Tomita et al.

(10) Patent No.: US 6,257,053 B1
(45) Date of Patent: Jul. 10, 2001

(54) SCANNING PROBE MICROSCOPE HAVING PIEZOELECTRIC MEMBER FOR CONTROLLING MOVEMENT OF PROBE

(75) Inventors: Eisuke Tomita; Masato Iyoki; Masao Hasegawa, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/337,613

(22) Filed: Jun. 21, 1999

(30) Foreign Application Priority Data

Jun. 22, 1998 (JP) .................................. 10-174424
Jun. 10, 1999 (JP) .................................. 11-164333

(51) Int. Cl.[7] .................................................. G01B 5/28
(52) U.S. Cl. ........................... 73/105; 250/306; 250/307; 250/442.11
(58) Field of Search ............................ 73/105; 250/306, 250/307, 442.11

(56) References Cited

U.S. PATENT DOCUMENTS

| | | | |
|---|---|---|---|
| 4,343,993 | * 8/1982 | Binnig et al. | 250/306 |
| 4,785,177 | * 11/1988 | Besocke | 250/442.11 |
| 4,800,274 | * 1/1989 | Hansma et al. | 250/306 |
| 5,146,690 | * 9/1992 | Breitmeier | 73/105 |
| 5,503,010 | * 4/1996 | Yamanaka | 73/105 |
| 5,900,618 | * 5/1999 | Anlage et al. | 250/306 |
| 5,990,477 | * 11/1999 | Tomita | 250/306 |
| 6,006,594 | * 12/1999 | Karrai et al. | 73/105 |

* cited by examiner

Primary Examiner—Hezron Williams
Assistant Examiner—Michael Cygan
(74) Attorney, Agent, or Firm—Adams & Wilks

(57) ABSTRACT

A scanning probe microscope comprises an elastic probe having a longitudinal axis and a probe tip. A vibration device has a piezoelectric vibrating member and an AC voltage generator for vibrating the probe tip relative to a surface of a sample. A vibration detecting device has a piezoelectric detecting member and a current/voltage amplifier circuit for detecting vibration of the probe tip. A probe holder supports the probe such that the probe is biased into pressure contact with the piezoelectric detecting member at an oblique angle relative to the longitudinal axis of the probe while the probe tip extends in a Z direction generally perpendicular to sample surface during vibration of the probe tip relative to the sample surface. A coarse movement mechanism effects coarse displacement of the probe tip in the Z direction to bring the probe tip close to the surface of the sample. A sample-to-probe distance control device has a fine displacement element and a servo circuit for effecting fine displacement of the probe tip in the Z direction. A two-dimensional scanning device has a fine displacement element and a scanning circuit for scanning the probe tip in X and Y directions to generate a measurement signal. A data processing device converts the measurement signal into a three-dimensional image.

28 Claims, 8 Drawing Sheets

SCANNING PROBE MICROSCOPE HAVING PIEZOELECTRIC MEMBER FOR CONTROLLING MOVEMENT OF PROBE

BACKGROUND OF THE INVENTION

1. Field of the Invention

The present invention relates to a scanning probe microscope utilizing a piezoelectric member as a distance control means for the probe.

2. Background Art

Conventionally there has been known, as a scanning probe microscope using a piezoelectric member as a distance controlling means for the probe, a scanning probe microscope using, for example, a tuning fork type quartz oscillator. For example, there are disclosures of scanning probe microscopes using such a tuning fork type quartz oscillator in Appl. Phys. Lett. 66(14), 1995, pp 1842–1844, by Khaled Karrai et al and in a publication of JP-A-9-89911. FIG. 10 is a schematic view of a principal part of a scanning probe microscope using a tuning fork type quartz oscillator. 400 is an optical fiber probe, and 410 is a tuning fork type quartz oscillator. The optical fiber probe is joined to a quartz oscillator by adhesion, and the quartz oscillator is oscillated by an oscillating piezoelectric member (omitted in FIG. 10). The piezoelectric oscillator if oscillated generates an electric current due to a piezoelectric effect. By detecting this current, it is possible to measure an oscillation state of the quartz oscillator. If the probe approaches a sample, the probe is acted on by a horizontal force from the sample, i.e. a shear force, and the quartz oscillator joined to the probe is changed in oscillation state. The sample-to-probe distance is adjusted using a Z-axis finely moving element (omitted in FIG. 10) in a manner of keeping constant a shear force, i.e. a change amount in amplitude or phase of a quartz oscillator output.

However, the foregoing scanning probe microscope using a conventional tuning fork type quartz oscillator has the following problems.

(1) Because the probe is adhesion-fixed to the tuning fork type quartz oscillator, the state of fixing largely varies due to environmental change such as temperature. Also, the state of the fixing portion is difficult to keep constant due to an amount of adhesive or adhesive method. As a result, vibration parameters, such as probe amplitude or Q value, varies or detection characteristics in force detection varies, resulting in instability in control.

(2) Re-utilization of the tuning fork type quartz oscillator is difficult due to fixing by adhesion.

(3) Because fixing is made such that a longitudinal direction of one surface of the tuning fork type quartz oscillator and an axial direction of the probe are parallel, the probe and the oscillator have an increased contact area. The contact area if increased makes difficult the reproducibility of the attaching state, causing an increase in the variation in vibration parameters such as probe amplitude or Q value or detection characteristic in force detection.

(4) In the tuning fork type quartz oscillator, the vibration piece not joined to the probe has an effect upon a detection signal, possibly causing malfunctioning. That is, in the case of the tuning fork type quartz oscillator, the oscillation piece joined to the probe receives a force from a sample through the probe. However, the other vibration piece maintains its natural vibrating state. In this manner, two vibration pieces are quite different in vibration state. One detects a force and changes, while the other does not change so that a resultant output does not directly reflect a force. Where this output is used as a Z servo feedback signal, there has been a defect that a probe-to-sample distance cannot be accurately controlled.

Therefore, the present invention has the following purposes.

(1) To provide a scanning probe microscope which maintains a state of a fixing portion irrespective of environmental change such as temperature or adhesive amount or adhesion method, obtaining stabilized vibration characteristics and detection characteristics.

(2) To provide a scanning probe microscope with which a detecting piezoelectric element can be reused.

(3) To provide a method of fixing a detecting piezoelectric element and probe by which a variation in vibration parameters such as probe amplitude and Q value or a variation in detection characteristic in force detection.

(4) To provide a scanning probe microscope which can accurately control a probe-to-sample distance by obtaining a detecting piezoelectric element that gives an output signal directly reflecting a force undergoing from a sample.

SUMMARY OF THE INVENTION

In order to solve the foregoing problems in the conventional art, a scanning probe microscope of the present invention is structured as stated below.

(1) A scanning probe microscope comprises a probe having a tip formed in a probe needle form, an oscillation section configured by an oscillating piezoelectric member and an alternating current generating means, a vibration detecting section formed by a detecting piezoelectric member and a current/voltage amplifying circuit, a probe holder for holding the probe and the oscillating piezoelectric member and the detecting piezoelectric member, a coarse movement mechanism for approaching the probe to a sample, a sample-to-probe distance control means formed by a Z-axis finely moving element and a Z servo circuit, a two dimensional scanning means formed by an XY finely moving element and an XY scanning circuit, and a data processing unit for making a measurement signal into a three dimensional image. In the scanning probe microscope according to the present invention the probe and the detecting piezoelectric member are joined by spring pressure of an elastic member.

This method eliminates the necessity of an adhesive for joining between the probe and the detecting piezoelectric member. It is possible to obtain a stable vibration characteristic or detection characteristic without suffering an affection of an adhesive. Also, the detecting piezoelectric element can be reused.

(2) The joining between the probe and the detecting piezoelectric member utilizes elasticity of the probe as it is. In this case, provided in the probe holder is an attaching portion defining an attaching angle of between the probe and the detecting piezoelectric member such that the probe at a tip is perpendicular to a sample surface.

This method eliminates the necessity of an adhesive for joining between the probe and the detecting piezoelectric member. It is also possible to prevent the resolving power from lowering because the attaching angle between the probe and the detecting piezoelectric member is adjusted such that the probe at its tip 1a is perpendicular to the sample surface.

(3) The detecting piezoelectric member is arranged with an inclination in a joining plane relative to the probe such that a contact area in the joining portion between the probe and the detecting piezoelectric member is smaller as compared to a case of joining with a probe axial direction and a detecting piezoelectric member beam longitudinal direction taken generally parallel.

This method reduces to a small amount the contact area between the probe and the detecting piezoelectric member as compared to uniform joining in the longitudinal direction. Even where the probe is exchanged, a reduction is made in a variation in vibration parameters such as probe amplitude or Q value, or in a variation in detection characteristic in force detection.

(4) The detecting piezoelectric member was structured by a piezoelectric beam having one vibration member.

This method provides a detecting piezoelectric element that gives an output signal directly reflecting a force undergone from the sample. Thus a probe-to-sample distance can be accurately controlled.

DETAILED DESCRIPTION OF THE PREFERRED EMBODIMENTS

Figure 1:
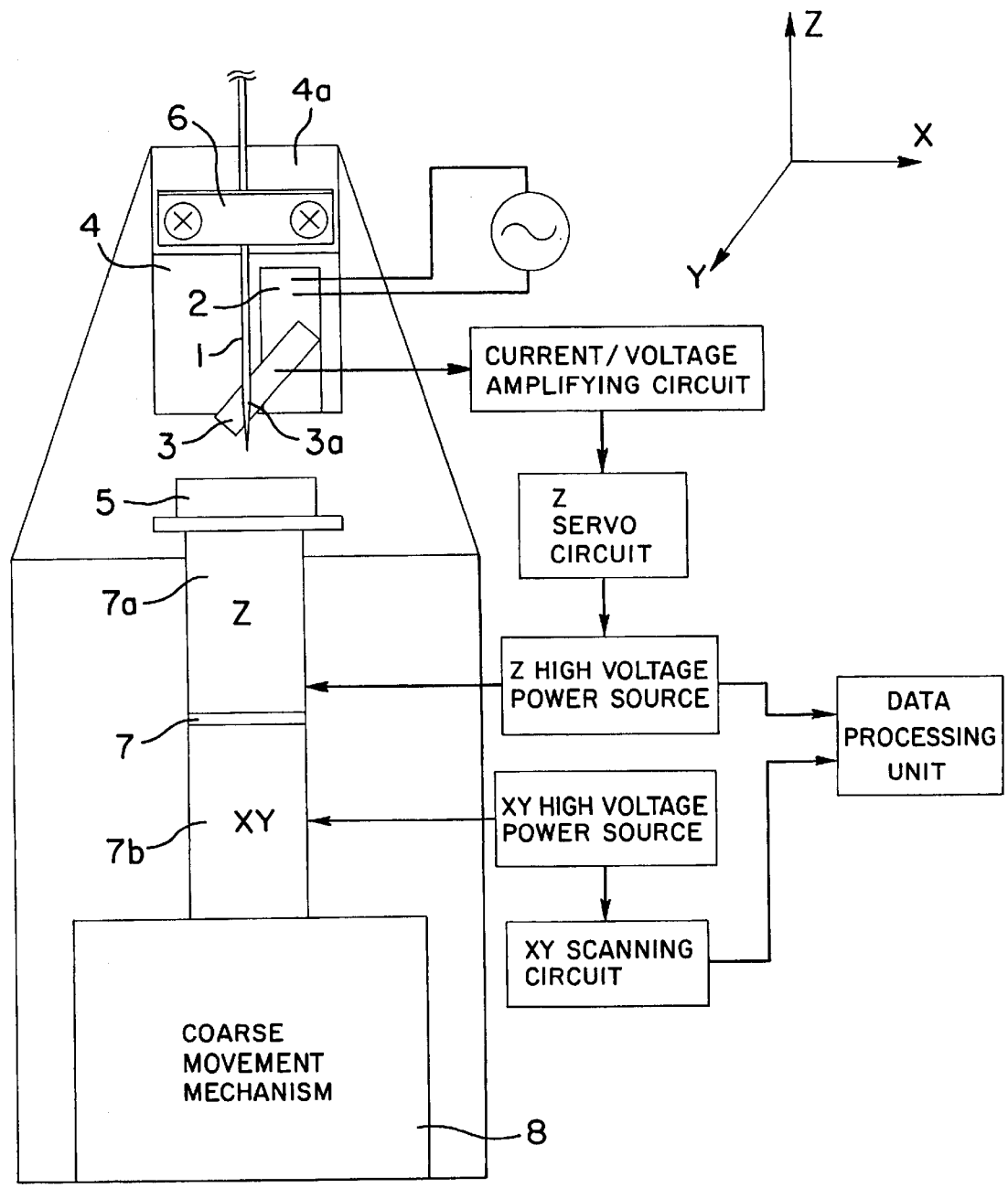
FIG. 1 is a schematic view of a first embodiment of a scanning probe microscope according to the present invention.

FIG. 1 is a schematic view of a scanning probe microscope of the present invention.

The scanning probe microscope of the present invention is structured by a probe 1 formed in a probe needle form at its tip, an oscillation section formed by an oscillating piezoelectric member 2 and an alternating current generating means, a vibration detecting section formed by a detecting piezoelectric member 3 and a current/voltage amplifying circuit, a probe holder 4 for holding the probe and oscillating piezoelectric member and detecting piezoelectric member, a coarse movement mechanism 8 for approaching the probe to a sample, a sample-probe distance control means formed by a Z-axis finely moving element 7a and a Z servo circuit, a two dimensional scanning means formed by an XY finely moving element 7b and an XY scanning circuit, and a data processing unit for making a measurement signal into a three dimensional image.

The detecting piezoelectric member 3 is attached together with the oscillating piezoelectric member 2 to the probe holder 4. On the other hand, the probe 1 is fixed independently of the detecting piezoelectric member in the probe holder 4 with a tip and its vicinity pressed against the detecting piezoelectric member 3. At this time, pressure (pressing force) is exerted to a contact portion 3a with the detecting piezoelectric member by deflecting the probe as it is, joining is stably made on the detecting piezoelectric member.

The detecting piezoelectric member 3 has a reduced area of contact with the probe. Even where the probe is replaced, the state of attachment is held in reproducibility. In order to reduce variation in vibration parameters such as probe amplitude or Q value or variation in detection characteristic in force detection, the detecting piezoelectric member 3 is arranged with inclination in a joining plane relative to the probe such that a contact area in the joining portion between the probe and the detecting piezoelectric member is smaller as compared to a case of joining with a probe 1 axial direction and a detecting piezoelectric member 3 beam longitudinal direction taken generally parallel.

Also, an inclination is provided in a probe fixing portion 4a on the probe holder to define an angle and attaching position so that a tip portion from the joining portion to the detecting piezoelectric member assumes perpendicular relative to a sample 5 when the probe is deflected.

If the probe 1 thus set is approached to the detecting piezoelectric member 3 to the sample 5 by the oscillation piezoelectric member 2 while being vibrated in parallel with the sample surface, a shear force acts on the probe, reducing vibration amplitude in the probe. Because the probe 1 and the detecting piezoelectric member 3 are joined to operate in one body, the reduction in probe 1 vibration amplitude becomes a reduction in detecting piezoelectric member 3 amplitude. This amplitude reduction reduces an output current of the detecting piezoelectric member 3. A distance between the sample 5 and the probe 1 is controlled by the Z-axis finely moving element 7a and Z servo circuit such that the output current is detected by the current/voltage amplifying circuit and the output current of the detecting piezoelectric member 3 becomes constant in change amount. In this state, the probe 1 is two dimensionally scanned over the sample surface to measure a sample shape. Based on this measurement signal a three dimensional image is obtained in the data processing unit.

The output current of the detecting piezoelectric member 3 used at this time generates only from one vibration member joined to the probe 1. By the use of the detecting piezoelectric member formed by one vibration member in this manner, there is no malfunction due to the affection of the vibration piece not joined to the probe as in a scanning probe microscope using a tuning fork type quartz oscillator. It is possible to realize a scanning probe microscope that an output signal directly reflecting a force undergone from the sample and a distance between the probe and the sample is accurately controlled.

Figure 2:
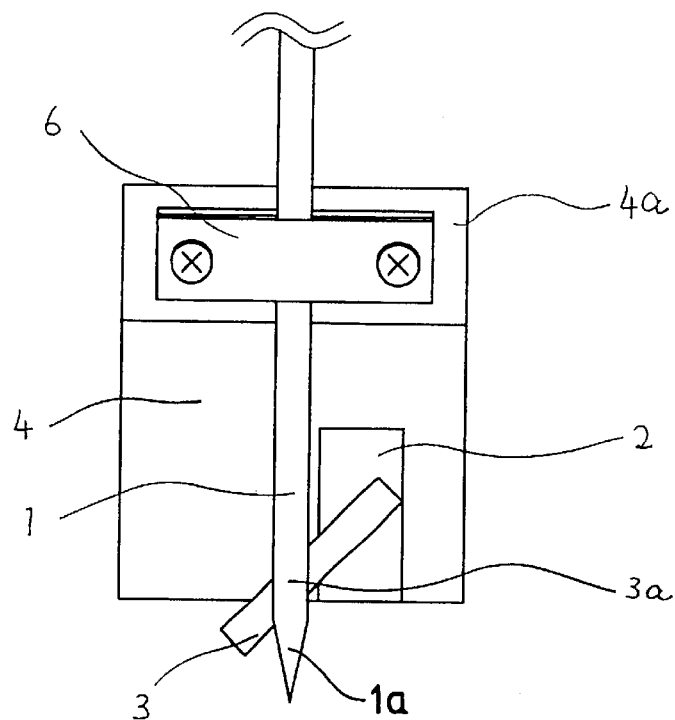
FIG. 2 is a front view of a probe holder section shown in FIG. 1.
Figure 3:
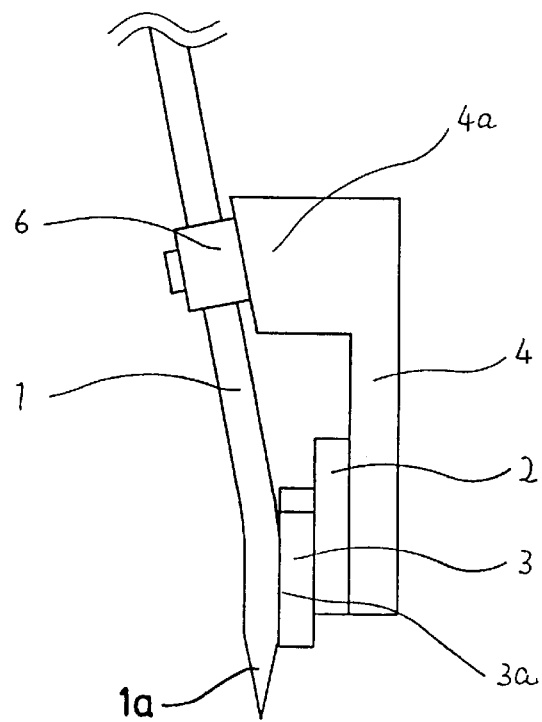
FIG. 3 is a right side view of FIG. 2.

FIG. 1 shows a schematic view of a first embodiment of a scanning probe microscope of the present invention. Also, FIG. 2 shows a front view of a probe holder section in FIG. 1, and FIG. 3 shows a right side view of FIG. 2.

This embodiment used a straight type probe formed in a probe needle form at a tip of an optical fiber to be used for a scanning near field microscope as one kind of the scanning probe microscope.

A beam was used as a detecting piezoelectric member 3 which is of quartz as a material of 0.25 mm width×0.1 mm thickness with 5 mm length. The oscillating piezoelectric member 2 used is a PZT formed in a plate shape with 10 mm length×5 mm width×0.5 mm thickness. The oscillating piezoelectric member 2 was adhesive-fixed in the holder main body 4. Further, the detecting piezoelectric member 3 is adhesive-fixed to the oscillating piezoelectric member 2. Incidentally, the oscillating piezoelectric member 2 and the detecting piezoelectric member 3 are electrically insulated.

The probe 1 is fixed on a probe holding jig 6 so that the jig as its entirety is screw-fixed to the holder main body.

The detecting piezoelectric member 3 is inclined by approximately 45 degrees relative to an axis of the probe 1 such that the area of a joining portion is decreased as compared to a case of joining with an axial direction of the probe 1 is coincident with a longitudinal direction of the beam of the detecting piezoelectric member 3. Thus arrangement was made such that, where the probe 1 is fixed through the holding jig 6 to the fixing portion, the probe 1 at its tip and the detecting piezoelectric member 3 are brought in crossing. Incidentally, the angle in a contact plane between the probe 1 and the detecting piezoelectric member 3 can be set arbitrary provided that in a state the joining portion area is decreased as compared to a state of generally parallel joining state in probe 1 axial direction and detecting piezoelectric member 3 longitudinal direction.

The holder has a fixing portion 4a inclined such that, when the probe 1 and the detecting piezoelectric member 3 are joined, the probe is caused deflection and pressure is applied to the joining portion. The height and inclination angle of the attaching portion are previously defined such that at this time a tip portion from the joining portion assumes perpendicular to a sample 5.

Figure 11:
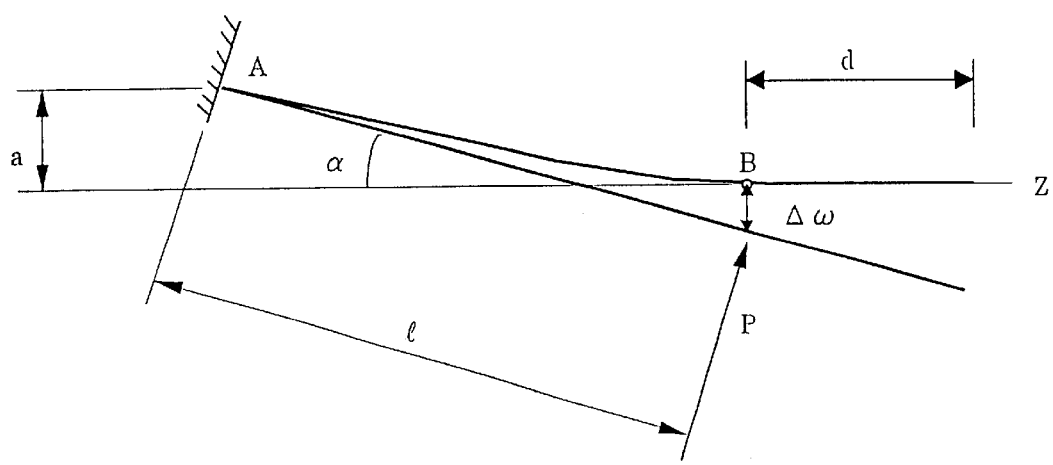
FIG. 11 is a typical view for explaining a method of attaching the probe.

Here, using a typical diagram of FIG. 11, explanation is made on a relationship between a probe attaching method and pressure.

As shown in FIG. 11, a contact point of the probe and the detecting piezoelectric member is taken at B and a Z axis is taken in a direction passing through B and perpendicular to the sample. The probe is fixed with an angle α in a position distant by a height a from the Z axis. Here, a point A is a fixing end of the probe.

Here, a portion of length l from the fixing end A is deflected by Δω and contacted in the point B, pressure P exerted on the point B becomes Equation (1).

$$P = 2EI\alpha/l^2 \quad (1)$$

Here, E is an Young's modulus of the material and I is a moment of inertia of section concerning a neutral axis of the probe.

Also, the relationship between a and α, when α is extremely small, becomes Equation (2).

$$a = l\alpha/3 \quad (2)$$

The present embodiment used a probe material of a quartz glass made optical fiber. It is assumed that the Young's modulus E and the diameter d of the optical fiber are respectively $E=6.9\times10^{10}$ Pa and $d=125\times10^{-6}$ m. Here, the length l was set $l=14.5\times10^{-3}$ m. From Equation (1) and Equation (2), a, α and P were respectively set $a=8\times10^{-4}$ m, $\alpha=0.17$ rad (9.5 deg.) and P=1.30 mN.

Here, where the pressure P is excessively small, the probe and the detecting piezoelectric member when oscillated are separated resulting in unstable operation. Meanwhile, where P is excessively large, an oscillation force is suppressed also resulting in unstable operation. Accordingly, optimization was made by an experiment according to the above-mentioned equation. Also, the length d of from the joining portion to the probe tip can be arbitrarily set. However, if d becomes significantly long, responsibility worsens and operation is unstable. Accordingly, d=1 mm was determined in the present embodiment.

Because the above structure does not use adhesion in fixing, it is possible to prevent the fixing portion from changing in state due to environmental change. It is also becomes possible to suppress against variation in fixing state due to an adhesive amount or adhesion method. As a result, prevention was made against change in vibration parameter such as probe amplitude and Q value, and against change of detected characteristic in force detection. In particular, measurement is effective at an extremely low temperature or elevated temperature because no temperature change effects are experienced.

Also, the detecting piezoelectric member can be used repeatedly.

Further, where the probe tip is not perpendicular to the sample, there is lowering in resolving power for an optical image of the scanning near field microscope or topographical image utilizing a shear force. However, the probe is installed perpendicular to a sample, and the resolving power is prevented from degrading.

Although in the present embodiment joining was made only by elastic member spring pressure, it can be considered that auxiliary adhesive joining is made in addition to spring pressure in order to prevent against deviation due to external disturbance. If one embodiment in which low adhesion is used, the adhesive has less effect because a joining state is dependent on spring pressure. Furthermore, the adhesive force if weakened enables also removal from the detecting piezoelectric member and hence repetitive use.

In a probe holder as constructed above is used and an alternating current is applied to the oscillating piezoelectric member 2, the oscillating piezoelectric member 2 vibrates to cause the detecting piezoelectric member 3 to oscillate. If the oscillation frequency is brought to a resonant frequency of the detecting piezoelectric member 3, the detecting piezoelectric member 3 oscillates. If the detecting piezoelectric member 3 oscillates, electric charges are induced onto an electrode of the detecting piezoelectric member 3 due to a piezoelectric effect and are detected as an electric current by the current/voltage amplifying circuit. Because there is generation of electric current proportional to a vibration amplitude in the detecting piezoelectric member, it is possible to measure a vibration state of the detecting piezoelectric member through a detected current.

An XYZ finely moving element 7 is arranged on an under side of the probe holder, and a sample 5 is rested on the finely moving element. The finely moving element used a piezoelectric tube element made integral with an XYZ three-axial scanner. Besides this, a piezo scanner separated between Z axis and XY axes and one using an electrostriction element can be considered as the finely moving element, which are included in the present invention. Besides, a piezo stage or a stage using a parallel spring, a tripod type piezoelectric element having one-axis piezo element arranged on XYZ three axes and integrated therewith, and a stacked type piezo scanner can be considered, which are all included in the present invention.

The sample 5 on the XYZ finely moving element is approached toward the probe 1 by using a coarse movement mechanism 8. The coarse movement mechanism used a coarse movement mechanism formed by a stepping motor, a reduction gear and a movement screw. As the coarse movement mechanism, besides these, can be considered one added with a stepping motor to the Z stage, a stage using a piezoelectric element, e.g. inch worm mechanism, and a stage combined with a Z stage and a piezoelectric element, which are all included in the present invention.

The data of the XY scanning circuit and Z servo circuit is inputted to the data processing unit, and made into three dimensional images. The data processing means used an electronic computer and a CRT display. Besides this, as the data processing means can be considered various methods including a storage oscilloscope and a combination of an electronic computer and a liquid crystal display, which are all included in the present invention.

Figure 4:
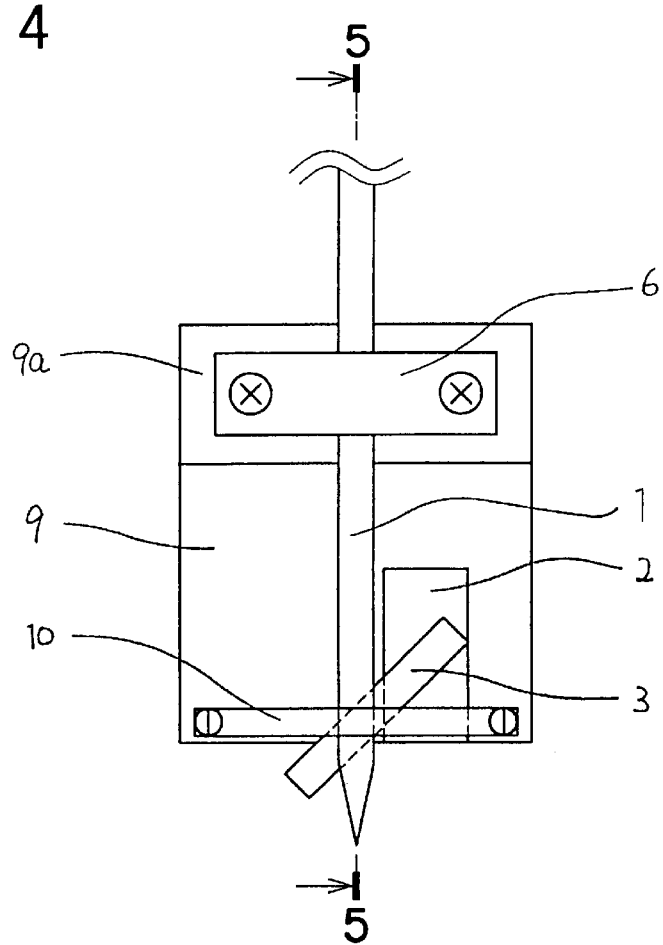
FIG. 4 is a front view of a probe holder section according to a second embodiment of a scanning probe microscope of the present invention.
Figure 5:
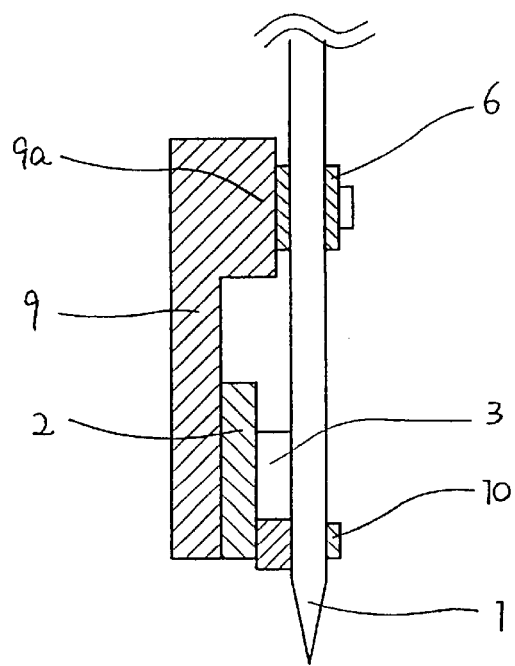
FIG. 5 is a cross-sectional view taken along section 5—5 in FIG. 4.

FIG. 4 is a front view of a probe holder section of a second embodiment of a scanning probe microscope of the present invention. FIG. 5 is an A—A sectional view of FIG. 4.

This embodiment, similarly to the FIG. 2 embodiment, used a straight type probe formed in a probe needle form at a tip of an optical fiber. A beam was used as a detecting piezoelectric element which is of quartz as a material having 0.25 mm width×0.1 mm thickness with 5 mm length. The oscillating piezoelectric member used PZT formed in a plate shape with 10 mm length×5 mm width×0.5 mm thickness. The oscillating piezoelectric member 2 was adhesive-fixed in the holder main body 4. Further, the detecting piezoelectric member 3 is adhesive-fixed to the oscillating piezoelectric member 2. Incidentally, the oscillating piezoelectric member 2 and the detecting piezoelectric member 3 are electrically insulated.

The probe 1 is fixed on a probe fixing jig 6 so that the jig as its entirety is screw-fixed to an attaching portion 9a the holder main body.

The detecting piezoelectric member 3 is inclined by approximately 45 degrees relative to an axis of the probe 1 such that the area of a joining portion is decreased as compared to a case of joining with an axial direction of the probe 1 is coincident with a longitudinal direction of the detecting piezoelectric member 3 beam. Thus arrangement was made such that, where the probe 1 is fixed through the holding jig 6 to the fixing portion 9a, the probe 1 at its tip and the detecting piezoelectric member 3 are brought in crossing.

For probe joining, a method was used that the detecting piezoelectric member 3 and the probe 1 are crossed such that pressing is made utilizing elasticity of a leaf spring 10 from above the probe.

Because this embodiment does not use adhesion in fixing, it is possible to prevent the fixing portion from changing in state due to environmental change. It is also becomes possible to suppress against variation in fixing state due to an adhesive amount or adhesion method. As a result, prevention was made against change in vibration parameter such as probe amplitude and Q value, and against change of detected characteristic in force detection. Also, the detecting piezoelectric member can be used repeatedly.

As an elastic member to be used for joining can be considered, besides a leaf spring, a coiled spring and rubber, which are all included in the present invention.

Figure 6:
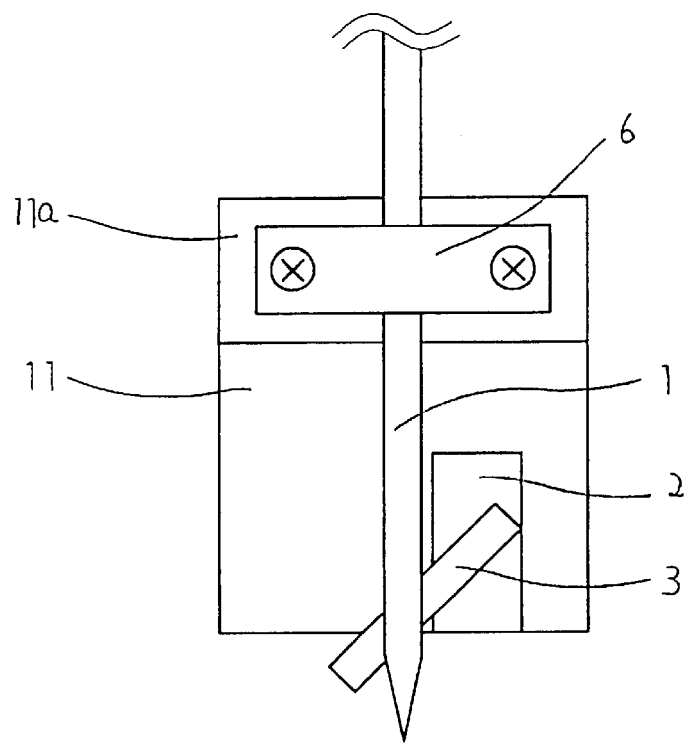
FIG. 6 is a front view of a probe holder section according to a third embodiment of a scanning probe microscope of the present invention.
Figure 7:
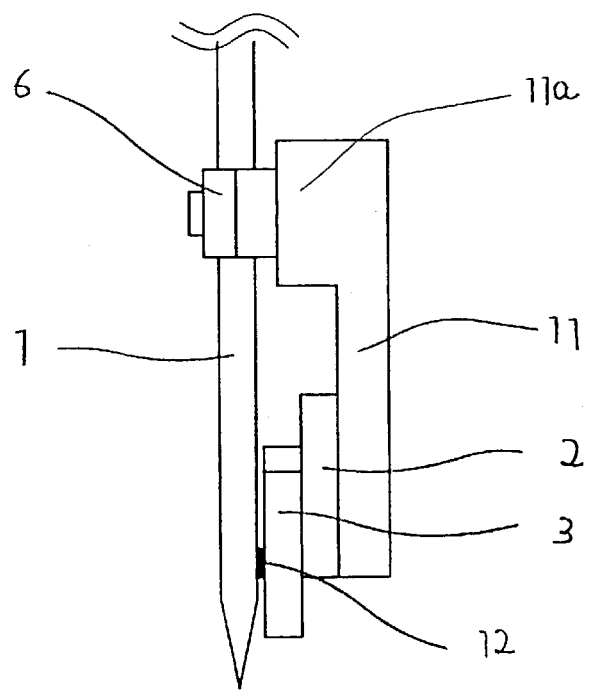
FIG. 7 is a right side view of FIG. 6.

FIG. 6 is a front view of a probe holder section of a third embodiment of a scanning probe microscope of the present invention. FIG. 7 is a right side view of FIG. 6.

This embodiment, similarly to the FIG. 2 embodiment, used a straight type probe formed in a probe needle form at a tip of an optical fiber. Also, rod formed quartz was used as the detecting piezoelectric member. The oscillating piezoelectric member used PZT formed in a plate shape. The oscillating piezoelectric member 2 was fixed by adhesion in the holder main body. Further, the detecting piezoelectric member 3 is fixed by adhesion to the oscillating piezoelectric member 2. Incidentally, the oscillating piezoelectric member 2 and the detecting piezoelectric member 3 are electrically insulated.

The probe 1 is fixed on a probe fixing jig 6 so that the jig as its entirety is screw-fixed to an attaching portion 11a the holder main body.

The detecting piezoelectric member 3 is inclined by approximately 45 degrees relative to an axis of the probe 1 such that the area of a joining portion is decreased as compared to a case of joining with an axial direction of the probe 1 is coincident with a longitudinal direction of the detecting piezoelectric member 3 beam. Thus arrangement was made such that, where the probe 1 is fixed through the holding jig 6 to the fixing portion 11a, the probe 1 at its tip and the detecting piezoelectric member 3 are brought in crossing.

For probe joining, a method was used that the detecting piezoelectric member 3 and the probe 1 are crossed to conduct adhesion on the joining portion 12.

Different from the above-state embodiment, in this embodiment the detecting piezoelectric member 3 is difficult to re-utilize. Further, it readily undergo environmental change such as temperature because of joining with adhesive. Also, the joining portion 12 has increased variation in state of joining. However, the area of the joining portion reduces due to an effect of obliquely arranging the detecting piezoelectric member in the joining plane, as compared to the conventional art that adhesive-fix generally in parallel in a probe axis direction and detecting piezoelectric member beam longitudinal direction. Due to this, there is an effect of decreasing variation in joining state.

Figure 8:
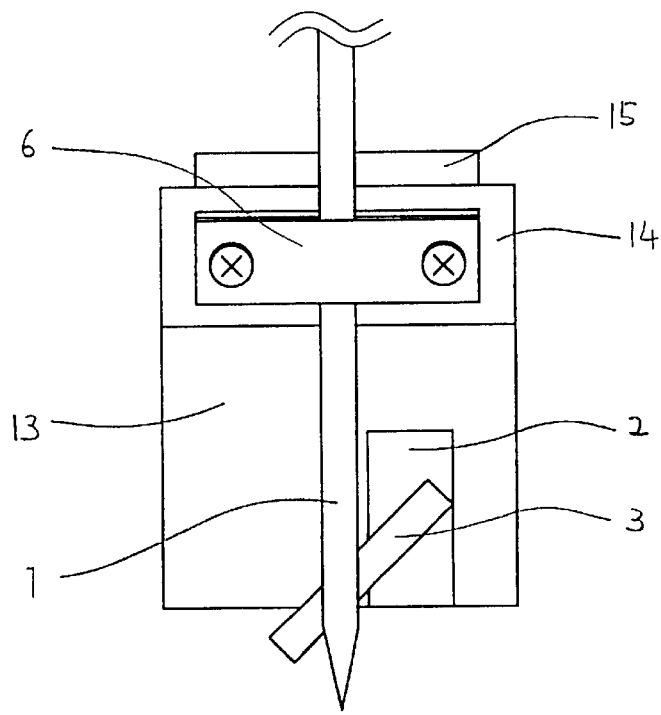
FIG. 8 is a front view of a probe holder section according to a fourth embodiment of a scanning probe microscope of the present invention.
Figure 9:
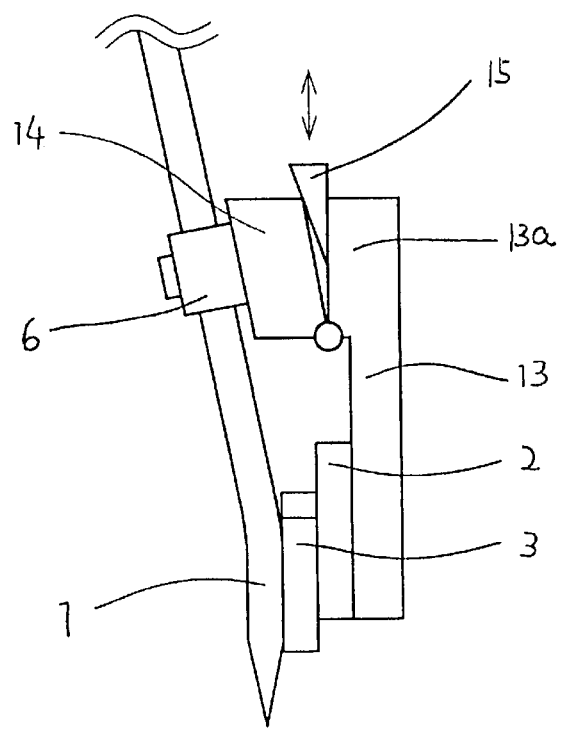
FIG. 9 is a right side view of FIG. 8.
Figure 10:
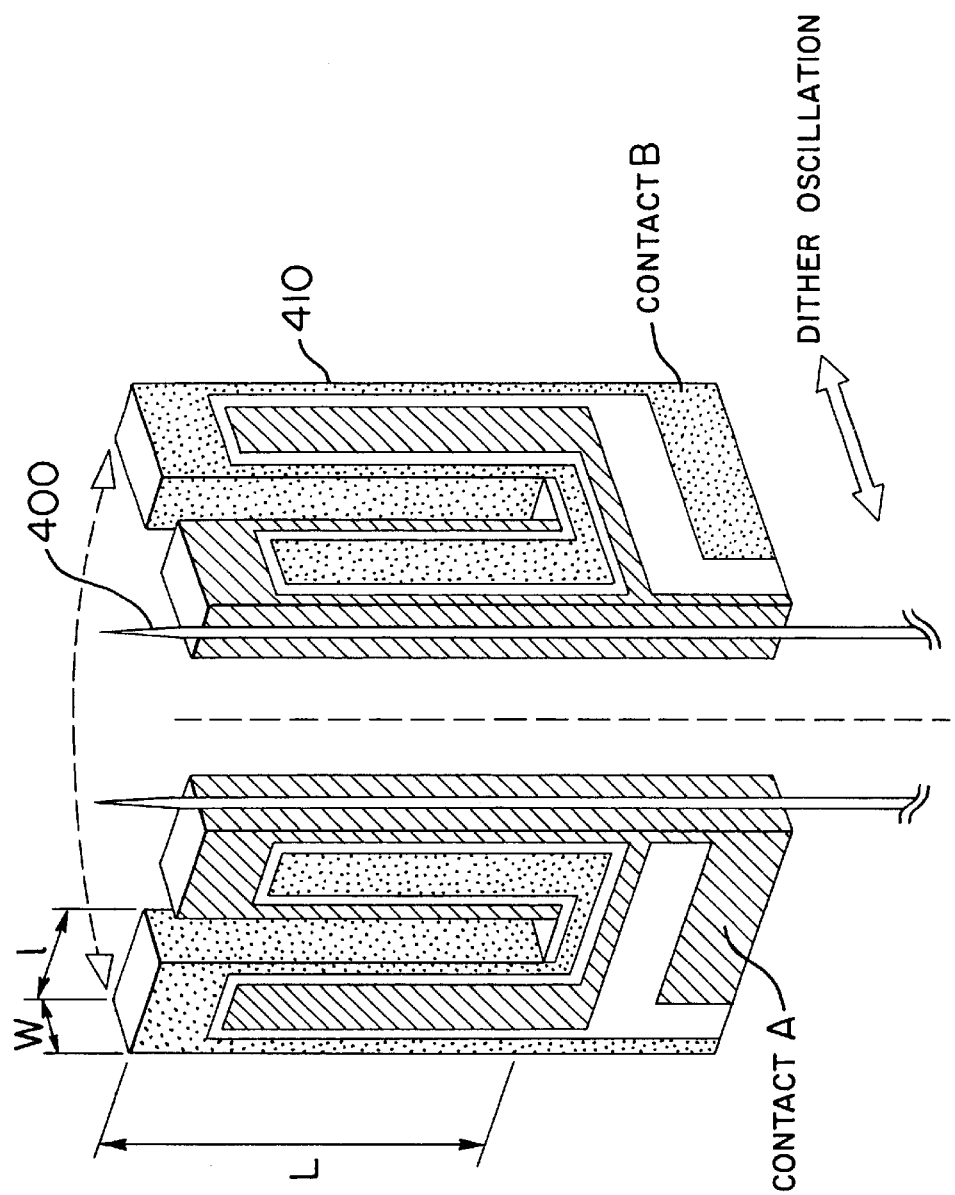
FIG. 10 is a schematic view of a scanning probe microscope using a conventional fork type oscillator.

FIG. 8 shows a front view of a probe holder of a fourth embodiment of a scanning probe microscope of the present invention. FIG. 9 shows a right side view of FIG. 8.

This embodiment basically has a similar apparatus structure to FIG. 2, which joins between the probe 1 and the detecting piezoelectric member 3. However, a mechanism is provided which can finely adjust probe attachment angle. A jig fixing portion 14 for attaching a probe is pivotally provided to a holder main body 13. A wedge type member 15 is inserted between the holding portion 14 and the holder main body 13. By inserting the wedge type member 15 through a screw mechanism (not shown), the probe attaching angle becomes variable, enabling fine adjustment of a probe tip angle relative to a sample.

In the first to fourth embodiments as explained above, a PZT tube scanner or stacked PZT can be considered, besides the laminar PZT, as the oscillating piezoelectric member, which are all included in the resent invention.

Also, the present invention includes a piezoelectric member formed of another material having piezoelectricity, besides quartz such as PZT, as a material for the detecting piezoelectric member. Also, in shape, there is no limitation to a beam with a rectangular section, wherein considered are a beam having an arbitrary section such as triangular or circular in section, a tuning fork-shaped quartz oscillator, a bimorph type piezoelectric element, and a detecting device in an arbitrary form having an elastic member laminated with a piezoelectric thin film, which are all included in the present invention. Furthermore, it can be considered that the detecting piezoelectric member and the oscillating piezoelectric member are made in one body.

Figure 12:
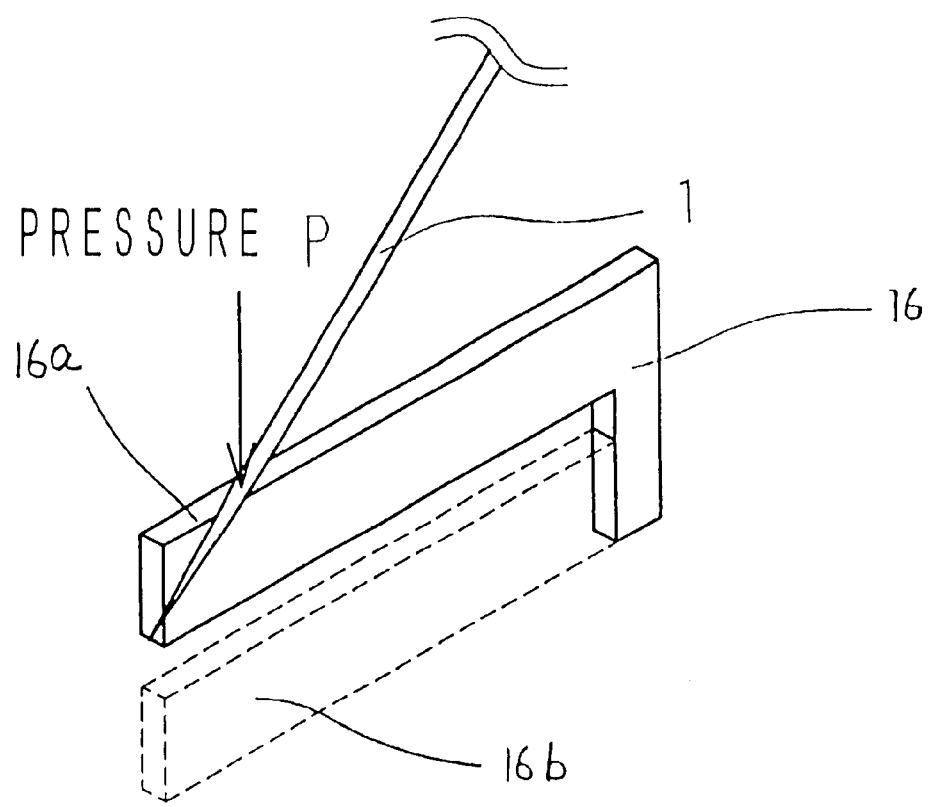
FIG. 12 is a schematic view of a case in which one vibration piece of a fork type quartz oscillator is removed and only one vibration piece is used for the detecting piezoelectric member.

Also, it can be considered that as shown in FIG. 12 the detecting piezoelectric member is applied with a tuning fork-shaped quartz oscillator 16 for a low cost timepiece wherein the tuning fork-shaped quartz oscillator is used by removing one oscillation piece 16b thereof to be formed into an oscillation member with only one oscillation piece 16a.

In the conventional method using a tuning fork-shaped quartz oscillator, despite an oscillation piece 16a joined to the probe is decreased of vibration amplitude due to a force undergone from a sample through the probe, the other oscillation piece 16b maintains its natural oscillation state. Thus two oscillation pieces are quite different in vibration state. One detects a force to change while the other does not change. Accordingly, the resultant output has not been directly reflected by a force.

By forming a timepiece quartz oscillator to use for a detecting piezoelectric member as shown in FIG. 12, the oscillation piece 16b not joined to the probe is prevented from having an effects upon a detection signal resulting in malfunctioning. Accordingly, where using an output of a tuning fork-shaped quartz oscillator as a Z servo feedback signal, it is possible to improve a defect that a probe-to-sample distance cannot be accurately controlled. Thus a quartz oscillator can be obtained which has a stable output characteristic and gives an output signal directly reflecting a force undergo from a sample. As a result, it became possible to accurately control a probe-to-sample distance and improve reproducibility of measurement data through a stable apparatus characteristic.

Also, as a probe can be used, besides a straight type fiber probe, a taper formed metal probe formed by chemically etching a rod-shaped tungsten tip, a glass pipette firmed in a taper form, and a bent type probe formed by an optical fiber bent at its tip, which are all included in the present invention. Furthermore, it can be considered in the second or third embodiment to apply a method of joining a silicon or silicon nitride cantilever by a elastic member spring pressure or using with adhesive joining. Although in the straight type probe control was made by a shear force, for a bent type probe or cantilever control is by an atomic force. As for a tip forming method can be considered a chemical etching, mechanical polishing and heat rolling, which are all included in the present invention. Furthermore, as for probe needle tip can be considered a magnetic force detecting probe formed with a magnetic film and a conductive probe formed with a gold or platinum film, which are all included in the present invention.

As explained above, in the scanning probe microscope of the preset invention, (1) in a scanning probe microscope comprising a probe having a tip formed in a probe needle form, an oscillation section configured by an oscillating piezoelectric member and an alternating current generating means, a vibration detecting section formed by a detecting piezoelectric member and a current/voltage amplifying circuit, a probe holder for holding the probe and the oscillating piezoelectric member and the detecting piezoelectric member, a coarse movement mechanism for approaching the probe to a sample, a sample-to-probe distance control means formed by a Z-axis finely moving element and a Z servo circuit, a two dimensional scanning means formed by an XY finely moving element and an XY scanning circuit, and a data processing unit for making a measurement signal into a three dimensional image, the scanning probe microscope characterized in that the probe and the detecting piezoelectric member are joined by spring pressure of an elastic member.

By using such a method of joining between the probe and the detecting piezoelectric member, no adhesive is used in fixing. It is possible to prevent the fixing portion from changing in state due to environmental change such as temperature. Also, variation in fixing state can be suppressed due to an adhesive amount and adhesion method. As a result, it is possible to prevent against change in vibration parameters such as probe amplitude or Q value or variation in detection characteristic in force detection.

Also, the detecting piezoelectric member can be re-utilize, the assembling process for a probe is shortened, and the cost required for the detecting piezoelectric member can be reduced.

Furthermore, where the joining between the probe and the detecting piezoelectric member utilizes elasticity of the probe as it is, provided in probe holder an attaching portion defining an attaching angle of between the probe and the detecting piezoelectric member such that the probe at a tip assumes perpendicular to a sample surface.

This method places the probe tip rectangular relative to the ample surface, enabling measurement without lowering in resolving power.

Furthermore, in the present invention, the detecting piezoelectric member is arranged with inclination in a joining plane relative to the probe such that a contact area in the joining portion between the probe and the detecting piezoelectric member is smaller as compared to a case of joining with a probe axial direction and a detecting piezoelectric member beam longitudinal direction taken generally parallel.

This method reduces small the area of contact of between the robe and the detecting piezoelectric member as compared to the case of uniform joining in a lengthwise direction. Even where the probe is replaced, improved is the reproducibility of attaching state. Decreased is variation in vibration parameters such as probe amplitude and Q value or variation in detection characteristic in force detection. As a result, stable control is possible to implement.

Furthermore, a detecting piezoelectric member is structured by a piezoelectric member with one vibration member.

As a result, a detecting piezoelectric member is obtained that gives an output signal directly reflecting a force undergone from the sample. It is possible to accurately control the distance between the probe and the sample.

What is claimed is:

1. A scanning probe microscope comprising: an elastic probe having a longitudinal axis and a probe tip; a vibration device having a piezoelectric vibrating member and an AC voltage generator for vibrating the probe tip relative to a surface of a sample; a vibration detecting device having a piezoelectric detecting member and a current/voltage amplifier circuit for detecting vibration of the probe tip; a probe holder for supporting the probe such that the probe is biased into pressure contact with the piezoelectric detecting member at an oblique angle relative to the longitudinal axis of the probe while the probe tip extends in a Z direction generally perpendicular to sample surface during vibration of the probe tip relative to the sample surface; a coarse movement mechanism for effecting coarse displacement of the probe tip in the Z direction to bring the probe tip close to the surface of the sample; a sample-to-probe distance control device having a fine displacement element and a servo circuit for effecting fine displacement of the probe tip in the Z direction; a two-dimensional scanning device having a fine displacement element and a scanning circuit for scanning the probe tip in X and Y directions to generate a measurement signal; and a data processing device for converting the measurement signal into a three-dimensional image.

2. A scanning probe microscope according to claim 1; wherein the probe is biased into pressure contact with the piezoelectric detecting member by elastic deformation of the probe and without using a biasing member.

3. A scanning probe microscope according to claim 1; further comprising means for adjusting the relative position between the probe tip and the sample surface by adjusting the angle between the probe and the piezoelectric detecting member to maintain the probe tip generally perpendicular to the sample surface during vibration of the probe tip relative to the sample surface.

4. A scanning probe microscope according to claim 1; wherein the probe is biased into pressure contact with the piezoelectric detecting member at a contact portion of the probe proximate the probe tip.

5. A scanning probe microscope according to claim 4; further comprising means for adjusting the relative position between the probe tip and the sample surface by adjusting the angle between the probe and the piezoelectric detecting member to maintain the probe tip generally perpendicular to the sample surface during vibration of the probe tip relative to the sample surface.

6. A scanning probe microscope according to claim 1; wherein the probe is biased into pressure contact with the piezoelectric detecting member along a contact area which is smaller than a contact area formed in the case in which the probe is contacted with the piezoelectric detecting member along a direction generally parallel to the longitudinal axis of the probe.

7. A scanning probe microscope according to claim 1; wherein the piezoelectric detecting member comprises a tuning fork-type quartz oscillator.

8. A scanning probe microscope according to claim 1; wherein the piezoelectric detecting member comprises a single vibration beam member.

9. A scanning probe microscope according to claim 1; wherein the probe comprises an optical fiber probe having a sharp probe tip.

10. A scanning probe microscope according to claim 1; wherein the probe is biased into pressure contact with the piezoelectric detecting member at a contact portion of the probe proximate the probe tip; and wherein the contact portion of the probe is disposed at an angle relative to the longitudinal axis of the probe.

11. A scanning probe microscope according to claim 1; wherein the probe is biased into pressure contact with the piezoelectric detecting member at a contact portion of the probe proximate the probe tip; and wherein the contact portion of the probe is generally parallel to the longitudinal axis of the probe.

12. A scanning probe microscope according to claim 1; further comprising an adhesive for adhering the probe to the piezoelectric detecting member.

13. A scanning probe microscope according to claim 1; wherein the probe comprises a needle-type probe having a sharp probe tip.

14. A scanning probe microscope according to claim 1; wherein the piezoelectric vibrating member is connected to the piezoelectric detecting member for vibrating the piezoelectric detecting member.

15. A scanning probe microscope comprising: an elastic probe having a longitudinal axis and a probe tip; vibrating means for vibrating the probe tip relative to a surface of a sample; vibration detecting means for detecting vibration of the probe tip; support means for supporting the probe such that the probe is biased into pressure contact with the vibration detecting means by elastic deformation of the probe without using a biasing member, the support means including means for connecting the probe to the vibration detecting means at an oblique angle relative to the longitudinal axis of the probe while the probe tip extends in a Z direction generally perpendicular to sample surface during vibration of the probe tip relative to the sample surface; a coarse movement mechanism for effecting coarse displacement of the probe tip in the Z direction to bring the probe tip close to the surface of the sample; a sample-to-probe distance control device having a fine displacement element and a servo circuit for effecting fine displacement of the probe tip in the Z direction; a two-dimensional scanning device having a fine displacement element and a scanning circuit for scanning the probe tip in X and Y directions to generate a measurement signal; and a data processing device for converting the measurement signal into a three-dimensional image.

16. A scanning probe microscope according to claim 15; further comprising means for adjusting the relative position between the probe tip and the sample surface by adjusting the angle between the probe and the vibration detecting means to maintain the probe tip generally perpendicular to the sample surface during vibration of the probe tip relative to the sample surface.

17. A scanning probe microscope according to claim 15; wherein the probe is biased into pressure contact with the vibration detecting means at a contact portion of the probe proximate the probe tip.

18. A scanning probe microscope according to claim 17; further comprising means for adjusting the relative position between the probe tip and the sample surface by adjusting the angle between the probe and the vibration detecting means to maintain the probe tip generally perpendicular to the sample surface during vibration of the probe tip relative to the sample surface.

19. A scanning probe microscope comprising: an elastic probe having a longitudinal axis and a probe tip; vibrating means for vibrating the probe tip relative to a surface of a sample; vibration detecting means for detecting vibration of the probe tip; support means for supporting the probe such that the probe is biased into pressure contact with the vibration detecting means by elastic deformation of the probe without using a biasing member, the probe being biased into pressure contact with the vibration detecting means along a contact area which is smaller than a contact area formed in the case in which the probe is biased into pressure contact with the vibration detecting means in a direction generally parallel to the longitudinal axis of the probe; a coarse movement mechanism for effecting coarse displacement of the probe tip in the Z direction to bring the probe tip close to the surface of the sample; a sample-to-probe distance control device having a fine displacement element and a servo circuit for effecting fine displacement of the probe tip in the Z direction; a two-dimensional scanning device having a fine displacement element and a scanning circuit for scanning the probe tip in X and Y directions to generate a measurement signal; and a data processing device for converting the measurement signal into a three-dimensional image.

20. A scanning probe microscope according to claim 15; wherein the vibration detecting means comprises a piezoelectric detecting member and an AC voltage generator.

21. A scanning probe microscope according to claim 20; wherein the piezoelectric detecting member comprises a tuning fork-type quartz oscillator.

22. A scanning probe microscope according to claim 20; wherein the piezoelectric detecting member comprises a single vibration beam member.

23. A scanning probe microscope according to claim 20; further comprising an adhesive for adhering the probe to the piezoelectric detecting member.

24. A scanning probe microscope according to claim 15; wherein the probe comprises an optical fiber probe having a sharp probe tip.

25. A scanning probe microscope according to claim 15; wherein the probe comprises a needle-type probe having a sharp probe tip.

26. A scanning probe microscope according to claim 15; wherein the probe is biased into pressure contact with the vibration detecting means at a contact portion of the probe proximate the probe tip; and wherein the contact portion of the probe is disposed at an angle relative to the longitudinal axis of the probe.

27. A scanning probe microscope according to claim 15; wherein the probe is biased into pressure contact with the vibration detecting means at a contact portion of the probe proximate the probe tip; and wherein the contact portion of the probe is generally parallel to the longitudinal axis of the probe.

28. A scanning probe microscope according to claim 15; wherein the vibration detecting means comprises a piezoelectric detecting member and an AC voltage generator; and wherein the vibrating means includes means for vibrating the piezoelectric detecting member.

* * * * *